US009151125B2

(12) United States Patent
Watters et al.

(10) Patent No.: US 9,151,125 B2
(45) Date of Patent: Oct. 6, 2015

(54) TEMPORARY FLUID DIVERSION AGENTS FOR USE IN GEOTHERMAL WELL APPLICATIONS

(75) Inventors: Larry Watters, Spring, TX (US); Daniel Bour, Granite Falls, WA (US)

(73) Assignee: AltaRock Energy, Inc., Seattle, WA (US)

( * ) Notice: Subject to any disclaimer, the term of this patent is extended or adjusted under 35 U.S.C. 154(b) by 0 days.

(21) Appl. No.: 12/837,978

(22) Filed: Jul. 16, 2010

(65) Prior Publication Data

US 2011/0011591 A1 Jan. 20, 2011

Related U.S. Application Data

(60) Provisional application No. 61/226,143, filed on Jul. 16, 2009, provisional application No. 61/258,965, filed on Nov. 6, 2009.

(51) Int. Cl.
| | |
|---|---|
| *E21B 21/00* | (2006.01) |
| *C04B 28/32* | (2006.01) |
| *E21B 33/13* | (2006.01) |
| *C09K 8/473* | (2006.01) |

(52) U.S. Cl.
CPC ............... *E21B 21/003* (2013.01); *C04B 28/32* (2013.01); *C09K 8/473* (2013.01); *E21B 33/13* (2013.01)

(58) Field of Classification Search
None
See application file for complete search history.

(56) References Cited

U.S. PATENT DOCUMENTS

| | | | | |
|---|---|---|---|---|
| 2,788,072 | A | * | 4/1957 | Goodwin ........................ 166/281 |
| 3,195,630 | A | | 7/1965 | Fisher |
| 3,302,719 | A | * | 2/1967 | Fischer ...................... 166/280.2 |
| 3,390,723 | A | | 7/1968 | Hower et al. |
| 3,439,744 | A | * | 4/1969 | Bradley ........................ 166/287 |
| 3,510,167 | A | * | 5/1970 | Carmody ........................ 299/4 |
| 3,526,097 | A | | 9/1970 | Nelson |
| 3,701,384 | A | * | 10/1972 | Routson et al. ............... 166/292 |
| 3,942,101 | A | | 3/1976 | Saye et al. |
| 3,960,736 | A | | 6/1976 | Free et al. |
| 4,055,399 | A | | 10/1977 | Parrish |
| 4,126,406 | A | | 11/1978 | Traylor et al. |
| 4,223,729 | A | | 9/1980 | Foster |
| 4,335,788 | A | * | 6/1982 | Murphey et al. ............... 166/278 |
| 4,492,083 | A | * | 1/1985 | McCabe et al. .............. 60/641.5 |
| 4,520,666 | A | | 6/1985 | Coblentz et al. |
| 4,559,818 | A | | 12/1985 | Tsang et al. |

(Continued)

FOREIGN PATENT DOCUMENTS

| | | |
|---|---|---|
| DE | 3925337 A1 | 2/1991 |
| EP | 0338154 A1 | 10/1989 |

(Continued)

OTHER PUBLICATIONS

Translated abstract for SU 1691513.*

(Continued)

*Primary Examiner* — Angela M DiTrani
(74) *Attorney, Agent, or Firm* — Thorpe North & Western, LLP (57) ABSTRACT

Systems, methods and compositions for temporary sealing fractures in subterranean formations employ at least one constituent for temporary sealing a fracture in a subterranean well. The degradation kinetics of the composition is dependent upon at least one degradation temperature-time parameter for designating a temperature range and a time at which the composition degrades.

9 Claims, 6 Drawing Sheets

(56) References Cited

U.S. PATENT DOCUMENTS

| | | |
|---|---|---|
| 4,573,537 A | 3/1986 | Hirasuna |
| 4,577,679 A | 3/1986 | Hibshman |
| 4,716,964 A | 1/1988 | Erbstoesser et al. |
| 4,749,035 A | 6/1988 | Cassity |
| 4,832,121 A | 5/1989 | Anderson |
| 4,926,949 A | 5/1990 | Forrest |
| 4,976,142 A | 12/1990 | Perales |
| 5,143,155 A | 9/1992 | Ferris et al. |
| 5,163,321 A | 11/1992 | Perales |
| 5,165,235 A | 11/1992 | Nitschke |
| 5,246,860 A | 9/1993 | Hutchins et al. |
| 5,515,679 A | 5/1996 | Shulman |
| 5,595,245 A | 1/1997 | Scott, III |
| 5,723,781 A | 3/1998 | Pruett et al. |
| 5,890,536 A | 4/1999 | Nierode et al. |
| 5,931,000 A | 8/1999 | Turner et al. |
| 5,944,446 A | 8/1999 | Hocking |
| 6,016,191 A | 1/2000 | Ramos et al. |
| 6,125,934 A | 10/2000 | Lenn et al. |
| 6,291,404 B2 | 9/2001 | House |
| 6,543,538 B2 | 4/2003 | Tolman et al. |
| 6,659,175 B2 | 12/2003 | Malone |
| 6,758,271 B1 | 7/2004 | Smith |
| 7,032,662 B2 | 4/2006 | Malone et al. |
| 7,207,389 B2 | 4/2007 | Foster et al. |
| 7,265,079 B2 | 9/2007 | Willberg et al. |
| 7,296,625 B2 | 11/2007 | East, Jr. |
| 7,299,873 B2 | 11/2007 | Hartman et al. |
| 7,347,260 B2 | 3/2008 | Ferguson et al. |
| 7,353,876 B2 * | 4/2008 | Savery et al. ............. 166/308.5 |
| 7,523,024 B2 | 4/2009 | Endres et al. |
| 7,565,929 B2 | 7/2009 | Bustos et al. |
| 7,654,326 B1 | 2/2010 | Samtra et al. |
| 2003/0006037 A1* | 1/2003 | Brothers et al. ............. 166/292 |
| 2003/0079877 A1 | 5/2003 | Wellington et al. |
| 2004/0074642 A1 | 4/2004 | Price-Smith et al. |
| 2005/0241828 A1 | 11/2005 | Almond et al. |
| 2006/0113077 A1 | 6/2006 | Willberg et al. |
| 2006/0169452 A1* | 8/2006 | Savery et al. ............. 166/280.2 |
| 2007/0042914 A1 | 2/2007 | Robertson et al. |
| 2007/0083331 A1 | 4/2007 | Craig et al. |
| 2007/0223999 A1 | 9/2007 | Curlett |
| 2007/0272407 A1 | 11/2007 | Lehman et al. |
| 2008/0026956 A1 | 1/2008 | Shinbach et al. |
| 2008/0083536 A1 | 4/2008 | Cavender et al. |
| 2008/0128108 A1 | 6/2008 | Clark |
| 2008/0171674 A1 | 7/2008 | Lewis et al. |
| 2008/0210423 A1 | 9/2008 | Boney |
| 2008/0236823 A1 | 10/2008 | Willberg et al. |
| 2009/0032252 A1* | 2/2009 | Boney et al. ............. 166/280.2 |
| 2009/0037112 A1 | 2/2009 | Soliman et al. |
| 2009/0065253 A1 | 3/2009 | Suarez-Rivera et al. |
| 2010/0000736 A1* | 1/2010 | Bour et al. ............. 166/281 |

FOREIGN PATENT DOCUMENTS

| | | | |
|---|---|---|---|
| EP | 0357317 A | 3/1990 | |
| EP | 0435430 A1 | 7/1991 | |
| EP | 1980604 A | 10/2008 | |
| GB | 2288694 A | 10/1995 | |
| SU | 1691513 | * 11/1991 | ............. E21B 43/11 |
| WO | WO 99/05394 A | 2/1999 | |
| WO | WO 2004/076815 A | 9/2004 | |
| WO | WO 2005/001242 A2 | 1/2005 | |
| WO | WO 2006/002325 A2 | 1/2006 | |
| WO | WO 2008/064074 | 5/2008 | |
| WO | WO 2008/107831 A2 | 9/2008 | |
| WO | WO 2008/122114 | 10/2008 | |
| WO | WO 2008/156970 | 12/2008 | |

OTHER PUBLICATIONS

Biopolymers: overview of several properties and consequences on their applications; K Van de Velde and P. Kiekens; Department of Textiles, Ghent University, Sep. 11, pp. 433-442.

Components on High Temperature Plugs: Progress Report on Polymers and Silicates; S. Bauer, D. Galbreath, J. Hamilton and A. Mansure; Geothermal Resources Council Transactions, vol. 28, Aug. 29-Sep. 1, 2004, pp. 145-152.

PCT/US2010/042364—Search Report, Sep. 9, 2010.

Biopolymers: overview of several properties and consequences on their applications; K. Van de Velde and P. Kiekens; Department of Textiles, Ghent University, Sep. 11, pp. 433-442.

Tester et al, The future of thermal energy: Impact of Enhanced Geothermal Systems (EGS) on the United States in the $21^{st}$ Century;(Retrieved from the Internet, <URL: geothermal.inel.gov/publications/future_or_geothermal_energy.pdf>) 2006, 372 pgs.

Greatly Enhanced Detectability of Geothermal Tracers Through Laser-Induced Fluorescence, Peter E. Rose, et al. Oct. 30, 2002; 10 pages.

Kinetics of Fluorescein Decay and Its Application as a Geothermal Tracer; Michael Adams and Jon Davis; vol. 20, No. 1/2; pp. 53-66, 1991.

PCT/US2010/038420—Search Report, Aug. 18, 2010.
PCT/US2010/036969—Search Report, Jul. 21, 2010.
PCT/US2009/042421—Search Report, Sep. 14, 2009.
PCT/US2009/042137—Search Report, Aug. 21, 2009.
PCT/US2009/049844—Search Report, Dec. 17, 2009.
PCT/US2009/053304—Search Report, Mar. 11, 2009.
PCT/US2010/030013—Search Report, Jun. 7, 2010.
PCT/US2009/054536—Search Report, Nov. 18, 2009.

* cited by examiner

TEMPORARY FLUID DIVERSION AGENTS FOR USE IN GEOTHERMAL WELL APPLICATIONS

CROSS REFERENCE TO RELATED APPLICATIONS

This application claims priority from U.S. provisional application No. 61/226,143, entitled "TEMPORARY FLUID DIVERSION AGENTS FOR USE IN GEOTHERMAL WELL APPLICATIONS" filed on Jul. 16, 2009, and U.S. provisional application no. 61/258,965, entitled "USE OF DEGRADING MATERIALS FOR WELLBORE STRENGTHENING/LOST CIRCULATION PREVENTION AND CONTROL" filed on Nov. 6, 2009, which are both incorporated by reference in their entirety, for all purposes, herein.

FIELD OF TECHNOLOGY

The present disclosure is generally directed to systems, methods and compositions for treating geothermal formations. More particularly, the present disclosure is directed to systems, methods and compositions for temporarily sealing fractures in geothermal formations.

BACKGROUND

Geothermal wells are drilled in subterranean formations with high temperatures. Heat is extracted from the formation through the well for use in surface electric power generation systems. Typical locations for suitable formations include areas close to volcanoes and tectonic plate interfaces. These target formations are usually located at relatively shallow subterranean depths (3000 to 8000 ft). In situ temperatures for these and other geothermal formations can range from 350-600° F.

Reservoirs targeted for conventional geothermal operations and Engineered Geothermal Systems ("EGS") operations are commonly non-permeable high temperature reservoirs containing naturally occurring fractures. Conventional geothermal wells are drilled in hot formations containing water. EGS wells are used to extract heat from high-temperature formations containing no liquids or relatively low amounts of liquid. In EGS formations, water can be injected into one well, circulated through fractures in the geothermal reservoir, and then produced out of a second well as hot geothermal fluid. Hot geothermal fluid or steam can be used to generate electricity. Fractures in EGS formations are not typically open to fluid flow and must be opened through the injection of water and hydro-shear dilation of the formation to create a permanent flow path for water and heat exchange.

Geothermal formations can contain an extensive network of naturally existing fractures. The width of open fractures can vary from less than 1/16 inch to greater than 2 inches. The fractures pose problems during drilling and completion of conventional geothermal wells and EGS wells. The fractures provide alternate flow paths for drilling fluid which is used to control the well, cool the drill bit and carry drill cuttings from the well. Open fractures can imbibe drilling fluid thereby reducing the rate of penetration and impeding progress of the drilling operation. Closed fractures can open during drilling due to hydrostatic pressure of the drilling fluid. The loss of drilling fluid from the wellbore into an open fracture, termed lost circulation, reduces drilling effectiveness and hinders subsequent well completion operations.

In related drilling and production operations, drilling fluids primarily composed of bentonite clay and barite can be used to increase the viscosity and density of the drilling fluid. During drilling operations, lost circulation can occur and large volumes of drilling fluid can flow into a fracture in a potentially productive interval of the well. At high temperatures, solids such as, bentonite and barite can form a non-removable solid mass that impedes or totally blocks productive flow from zones in the well. These solids can also damage the formation.

Therefore, there is a need in the field of art for non-damaging drilling fluids and weighting materials. There is also a need in the field of art for improved systems, methods and compositions for sealing fractures in subterranean formations to prevent lost circulation.

SUMMARY

Systems, methods and compositions for temporary sealing fractures in subterranean formations are herein disclosed. According to one embodiment, a composition comprising at least one constituent for temporary sealing a fracture in a subterranean well is provided. The degradation kinetics of the composition is dependent upon a degradation temperature-time parameter for designating a temperature range and a time at which the composition degrades.

In another embodiment, a method for temporarily sealing a fracture in an open-hole interval of a subterranean well is provided. A temporary fracture sealing composition is introduced proximate a fracture in an open-hole interval within a subterranean well. The temporary fracture sealing composition is permitted to at least partially seal the fracture. The temporary fracture sealing composition is permitted to substantially degrade over time due to heat exposure.

The foregoing and other objects, features and advantages of the present disclosure will become more readily apparent from the following detailed description of exemplary embodiments as disclosed herein.

BRIEF DESCRIPTION OF THE DRAWINGS

Embodiments of the present application are described, by way of example only, with reference to the attached Figures, wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein. It will be understood by those of ordinary skill in the art that the systems, methods and compositions herein disclosed can be applied or used in subterranean formations including, but not limited to geothermal formations, oil containing formations, gas containing formations, water containing formations and other formations containing fluids or mixtures thereof.

Figure 1:
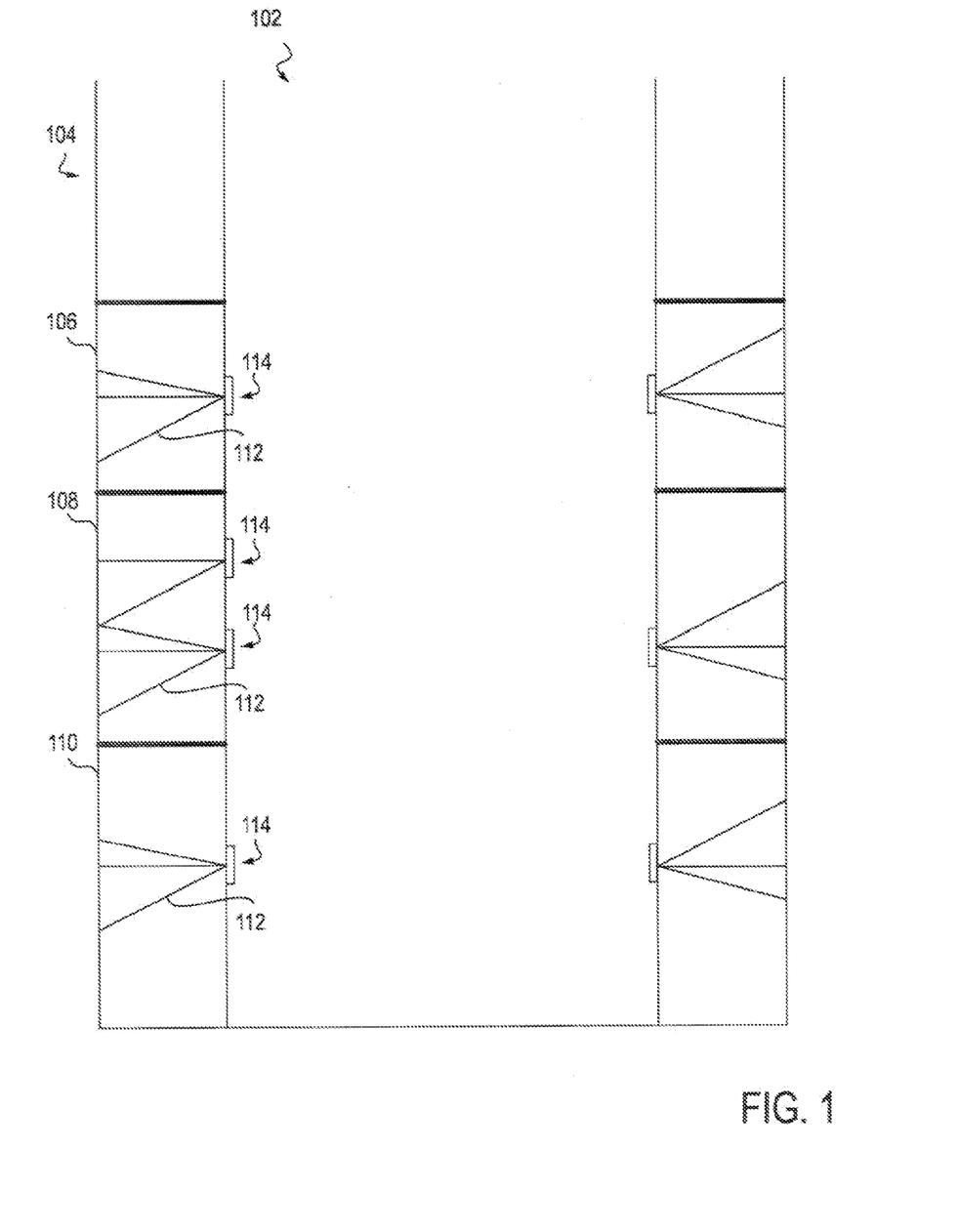
FIG. 1 illustrates an exemplary system for temporarily sealing fractures within a subterranean formation according to one embodiment.

FIG. 1 illustrates an exemplary system for temporarily sealing fractures within a subterranean formation 104 according to one embodiment. A subterranean well 102 can be drilled in a subterranean formation 104. The subterranean well 102 and subterranean formation 104 can include a series of open-hole intervals 106, 108, 110 located at varying subterranean depths. The subterranean formation 104 can also contain one or more fracture networks or fractures 112 within one or more of the open-hole intervals 106, 108, 110. Fractures or fracture networks 112 intersecting the subterranean well 102 or wellbore create flow paths for operational fluids used during well drilling, well completion, production and fluid injection operations causing lost circulation of one or more operational fluids within the fractures 112.

A temporary fracture sealing composition 114 can be introduced into the subterranean well 102 by pumping, injecting or circulating the temporary fracture sealing composition 114 into the subterranean well 102 to temporarily plug or seal fractures or fracture networks 112 intersecting the subterranean well 102 or wellbore. The temporary fracture sealing composition 114 prevents lost circulation of operational fluids within one or more fracture networks or fractures 112 intersecting the subterranean well 102 or wellbore. The temporary fracture sealing composition 114 degrades after exposure to a designated temperature or within a designated temperature range over a degradation time period. The degradation temperature and degradation time period within which the temporary fracture sealing composition 114 degrades is dependent upon one or more degradation temperature-time parameters that can be predetermined prior to using the temporary fracture sealing composition 114.

In an exemplary embodiment, the temporary fracture sealing composition 114 is a sized solid particulate having a designated particle size distribution sufficient to seal or at least partially restrict flow of operational fluids into one or more fracture networks or fractures 112 intersecting the subterranean well 102 or wellbore. Preferably, the particle size distribution of the temporary fracture sealing composition 114 includes a range of apertures typically from less than 1/16-inch to 2 inches. Preferably, the temporary fracture sealing composition 114 remains solid and bridges across a fracture 112 for up to 2 weeks at a bottom-hole temperature of 300° F. Preferably, the temporary fracture sealing composition 114 dissolves or otherwise degrades at temperatures of 400 to 500° F. in less than 4 weeks leaving negligible residue.

The temporary fracture sealing composition 114 can be formulated as water soluble cements including, but not limited to magnesium oxychloride, magnesium oxysulfate and zinc oxychloride derived from reactants including, but not limited, to the following reactants:
$MgO+MgCl_2+H_2O$ wherein, calcium (Ca), calcium sulfate $(CaSO_4)$, gypsum $(CaSO_4.2H_2O)$, EPSOM Salt® $(MgSO_4.7H_2O)$, calcium silicate $(Ca_2SiO_4)$ and/or calcium carbonate $(CaCO_3)$ can be added at various concentrations to lower the water solubility of the temporary fracture sealing composition 114; $MgO+Mg_2SO_4$ wherein increasing the MgO concentration decreases the water solubility of the temporary fracture sealing composition 114; and $ZnO+ZnCl_2$.

Temporary fracture sealing compositions 114 formulated as water soluble cements from the above disclosed reactants can be ground to form solid particulates having designated particle size distributions. Physical modifiers or chemically active modifiers can be optionally added to the water soluble cement to control the solubility kinetics, degradation temperature and degradation time period within which the temporary fracture sealing composition 114 degrades.

In an exemplary embodiment, the water soluble cement can be physically modified by adding the water soluble cement to a solvent to form a slurry. Stable nitrogen foam can be added to the slurry to reduce the density of the cement. The water soluble cement, nitrogen foam and solvent mixture are permitted to set before the mixture is ground. The water soluble cement mixture can be ground to increase permeability of the cement and to increase the rate of reaction, dissolution or degradation of the water soluble cement when exposed to water and/or heat.

In an exemplary embodiment, the degradation rate of the water soluble cement can be modified by adding one or more chemically active additives including, but not limited to ground polylactic acid (PLA) and a solvent to form a water soluble cement mixture or slurry. The mixture or slurry is permitted to set. Once the mixture is introduced into a well during a diversion operation, the PLA in the cement hydrolyzes when exposed to water leaving small void spaces within the cement matrix. The voids within the water soluble cement increase permeability and solubility of the cement and the rate of reaction, dissolution or degradation of the water soluble cement when exposed to water and/or heat. In another exemplary embodiment the water soluble cement can be chemically modified to alter the solubility of cement in water by including sodium chloride (NaCl) in the water soluble cement slurry. The NaCl acts to slow the rate of dissolution of the water soluble cement when exposed to water.

The water soluble cement can be introduced into the subterranean well 102 by pumping, injecting or circulating the water soluble cement mixed with an operational fluid into the subterranean well 102 to temporarily plug or seal fractures or fracture networks 112 intersecting the subterranean well 102 or wellbore. The water soluble cement prevents lost circulation of operational fluids within one or more fracture networks or fractures 112 intersecting the subterranean well 102 or wellbore.

The water soluble cement degrades after exposure to designated temperature or within a designated temperature range over a degradation time period. The solubility kinetics, degradation temperature and degradation time period within which the water soluble cement degrades are dependent upon one or more degradation temperature-time parameters including, but not limited to the density of the water soluble cement, the particle size distribution of the water soluble cement, the concentration of constituents or reactants used to make the water soluble cement and optionally the concentration of physical or chemical modifiers within the water soluble cement.

In an exemplary embodiment, one or more hydrolysable polyesters including, but not limited to polycarbonate, polyacramide, polylactic acid and polypropenol can be added to the water soluble cement to aid in the chemical degradation of the water soluble cement after the desired well operation is complete. When exposed to heat, the hydrolysable polyester degrades or hydrolyzes into a water soluble organic acid monomer. Preferably, the hydrolysable polyester degrades or hydrolyzes at a temperature of 500° F. or greater. The rate at which the hydrolysable polyester degrades or hydrolyzes is dependent upon the chemical composition, molecular weight and degree of crystallinity of the hydrolysable polyester. Hydrolysable polyesters with higher molecular weights and higher degrees of crystallinity degrade or hydrolyze at slower rates. After degradation of the hydrolysable polyester, the resulting water soluble organic acid monomer reacts with the water soluble cement to aid in the degradation of the water soluble cement. Therefore, the degradation rate of the water soluble cement can be controlled or affected by the composition, molecular weight and degree of crystallinity of the hydrolysable polyester that is added to the water soluble cement.

Temporary fracture sealing compositions 114 formulated as water soluble cements from the above disclosed reactants can additionally be foamed by adding a foaming agent and optionally air and nitrogen directly to the water soluble cement or to reactants used to form the water soluble cement. By foaming the water soluble cement or by adding air or nitrogen to reactants forming the water soluble cement, the density of the water soluble cement can be controlled or modified. The density of the water soluble cement affects the solubility kinetics, degradation temperature and degradation time period within which the water soluble cement degrades. Water soluble cements with higher densities have lower degradation rates.

In another exemplary embodiment, the temporary fracture sealing compositions 114 formulated as water soluble cements from the above disclosed reactants can be combined with water to form cement slurries wherein the solid particulates having designated particle size distributions are suspended in aqueous solution. A suspending gel can optionally be added to the cement slurry to increase the viscosity of the cement slurry and to maintain suspension of the solid particulates therein. Exemplary suspending gels can include, but are not limited to organic polymer gelling agents, such as hydroxypropyl guar (HPG), guar gum and xanthan gum.

The cement slurry sets or cures at a designated set time. The cement slurry can be introduced into the subterranean well 102 by pumping, injecting or circulating the cement slurry into the subterranean well 102 to temporarily plug or seal fractures or fracture networks 112 intersecting the subterranean well 102 or wellbore. The cement slurry prevents lost circulation of operational fluids within one or more fracture networks or fractures 112 intersecting the subterranean well 102 or wellbore.

The cement slurry degrades after exposure to a designated temperature or within a designated temperature range over a degradation time period. The set or cure time of the cement slurry, the degradation kinetics, the degradation temperature of the cement slurry and degradation time period within which the cement slurry degrades is dependent upon one or more degradation temperature-time parameters including, but not limited to the density of the cement slurry, the particle size distribution of soluble cement within the cement slurry, the concentration of constituents or reactants used to make the cement slurry, the concentration of water in the cement slurry and optionally the concentration of suspending gel within the cement slurry.

In an exemplary embodiment, one or more hydrolysable polyesters including, but not limited to polycarbonate, polyacramide, polylactic acid and polypropenol can be added to the cement slurry to aid in the chemical degradation of the cement slurry after the slurry has set and the desired well operation is complete. When exposed to heat, the hydrolysable polyester degrades or hydrolyzes into a water soluble organic acid monomer. Preferably, the hydrolysable polyester degrades or hydrolyzes at a temperature of 500° F. or greater. The rate at which the hydrolysable polyester degrades or hydrolyzes is dependent upon the chemical composition, molecular weight and degree of crystallinity of the hydrolysable polyester. Hydrolysable polyesters with higher molecular weights and higher degrees of crystallinity degrade or hydrolyze at slower rates. After degradation of the hydrolysable polyester, the resulting water soluble organic acid monomer reacts with the cement slurry to aid in the degradation of the cement slurry. Therefore, the degradation rate of the cement slurry can be controlled or affected by the composition, molecular weight and degree of crystallinity of the hydrolysable polyester that is added to the cement slurry.

In another exemplary embodiment, any hydrolysable polymer can be added to the cement slurry to control or modify the degradation of the cement slurry after the slurry has set and the desired well operation is complete. A thermally degradable wax coating can be applied to the hydrolysable polymer before mixing with the cement slurry. The thickness of thermally degradable wax coating can be tailored to control or modify the degradation time or degradation rate of the thermally degradable wax coating. After the thermally degradable wax coating degrades under heat, the hydrolysable polymer begins to hydrolyze to aid in the chemical degradation of the cement slurry. Therefore, the degradation kinetics, the degradation temperature of the cement slurry and degradation time period within which the cement slurry degrades can be controlled or modified by tailoring the concentration of hydrolysable polymer added to the cement slurry and the thickness of the thermally degradable wax coating applied to the hydrolysable polymer.

In an exemplary embodiment, the temporary fracture sealing compositions 114 herein disclosed can be used during drilling operations. Referring again to FIG. 1, the subterranean well 102 can be drilled into the subterranean formation 104, such as a geothermal formation with an earth boring drill bit. During drilling of the subterranean well 102, an operational fluid, such as drilling fluid is pumped or injected into the well to stabilize the well 102, cool the drill bit and carry drill cuttings from the well 102. Fractures or fracture networks 112 intersecting the subterranean well 102 or wellbore create flow paths for drilling fluid causing lost circulation of the drilling fluid within the fractures 112. Expensive drilling fluid can be lost or imbibed in the subterranean formation 104 which can result in drill bit damage, well damage and potentially well blowout. The temporary fracture sealing compositions 114 herein disclosed can be combined or mixed with drilling fluid during drilling operations and pumped or injected into the subterranean well 102 with the drilling fluid to act as a temporary lost circulation material. The sized solid particulate within the temporary fracture sealing composition 114 bridges off the face of the fracture 112, plugs or at least partially seals the fracture 112, thereby redirecting the flow of drilling fluid into the subterranean well 102 or wellbore.

In subterranean wells such as geothermal wells, the well 102 can be temporary cooled by the drilling fluid during drilling operations. After drilling operations, the subterranean well 102 can be permitted to increase in temperature towards the geostatic temperature of the well. The increase in temperature causes degradation of the temporary fracture sealing composition 114. In this way, the temporary fracture sealing composition 114 can be removed from the face of or from within fractures or fracture networks 112. After removal or degradation of the temporary fracture sealing composition 114, the fractures 112 revert to an unblocked state to allow recovery of heat from the subterranean formation 104. Heated water can be optionally injected into the subterranean well 102 to aid in the degradation and dissolution of the temporary fracture sealing composition 114.

In another exemplary embodiment, the temporary fracture sealing compositions 114 herein disclosed can be combined or mixed with drilling fluid during drilling operations and pumped or injected into the subterranean well 102 with the drilling fluid to act as a weighting agent. Conventional drilling fluids use finely ground solid particle or organic material (usually barite) to increase the drilling fluid density. The density increase is usually required to increase the hydrostatic pressure of the drilling fluid within the well in order to control reservoir pressure and prevent well blowout during drilling operations. Conventional weighting agents can become lodged in fractures or fracture networks intersecting the wellbore are difficult or irremovable from the fractures and can cause damage to the fractures. The temporary fracture sealing compositions 114 herein disclosed can be mixed with drilling fluid during drilling operations to increase the density of the drilling fluid. The sized solid particulate within the temporary fracture sealing composition 114 bridges off the face of the fracture 112, plugs or at least partially seals the fracture 112, thereby redirecting the flow of weighted drilling fluid into the subterranean well 102 or wellbore.

In subterranean wells such as geothermal wells, the well 102 can be temporary cooled by the weighted drilling fluid during drilling operations. After drilling operations, the subterranean well 102 can be permitted to increase in temperature towards the geostatic temperature of the well. The increase in temperature causes degradation of the temporary fracture sealing composition 114. In this way, the temporary fracture sealing composition 114 can be removed from the face of fractures or fracture networks 112. After removal or degradation of the temporary fracture sealing composition 114, the fractures 112 revert to an unblocked state without damage to the fracture to allow recovery of heat from the subterranean formation 104. Heated water can be optionally injected into the subterranean well 102 to aid in the degradation and dissolution of the temporary fracture sealing composition 114.

In another exemplary embodiment, the temporary fracture sealing compositions 114 herein disclosed can be used during hydraulic stimulation operations in geothermal and EGS formations. Referring again to FIG. 1, the subterranean well 102 including a wellbore is drilled in a subterranean formation 104. The subterranean well 102 can be an EGS well drilled in an EGS formation 104. The subterranean well 102 and subterranean formation 104 can include a series of open-hole intervals 106, 108, 110 located at varying subterranean depths. The subterranean formation 104 can also contain one or more fracture networks or fractures 112 within the open-hole intervals 106, 108, 110.

Once the EGS well 102 is drilled to target depth, the reservoir rock formation 104 must be hydraulically stimulated in order to create or enhance the permeability of the formation 104. During hydraulic stimulation operations, an operational fluid, such as stimulation fluid is injected into the well 102 under high pressure sufficient to open or stimulate fractures 112 that intersect the well 102 or wellbore. Stimulation fluid for simulating fractures can include water, brine and/or other operational fluid that is capable of stimulating fractures and that is compatible with other potentially naturally occurring fluids in the EGS formation 104. Once the fractures 112 are open or stimulated, the fractures 112 slip due to the existing stress created by the weight of the formation 104. As the face of a fracture or fracture network 112 shifts, the irregularities across the face of the fracture 112 prevent the fracture from completely closing. The open or stimulated fractures 112 increase the permeability of the formation 104 to allow for the efficient recovery of heat from the EGS formation 104.

It is undesirable to propagate fractures 112 or create new fractures beyond the efficient heat recovery rate of the geothermal or EGS formation 104 and the hydraulic stimulation process for EGS wells is difficult to control due to the existence of long open-hole intervals 106, 108, 110 that can intersect large numbers of fractures. Fractures 112 in the formation 104 are held closed by stress created from the weight of the formation 104. Fractures 112 open or stimulate at varying pressures due to the variance of in situ formation stress caused by variance in subterranean depth, the variance in fracture orientation and the variance in localized mechanical properties of the reservoir rock in the formation 104. Due to the overburden stress on the formation 104, fractures 112 at shallower subterranean depths typically open or stimulate at lower stimulation pressures than fractures 112 at greater subterranean depths. Therefore, when operational fluid, such as stimulation fluid is injected or pumped into the EGS well 102 to pressurize open-hole intervals 106, 108, 110, fractures 112 within an open-hole interval 106 at a relatively shallower subterranean depth will be stimulated first.

Once shallower fractures 112 are opened or stimulated, a significant portion of the injected stimulation fluid enters the stimulated fracture 112 extending its open length. Fractures 112 in open-hole intervals 108, 110 located at greater subterranean depths and having higher fracture initiation pressures may remain unstimulated during stimulation of fractures 112 with lower fracture initiation pressures. Increasing pressure in the EGS well 102 is difficult after stimulation of an un-isolated open-hole interval 106 at a relatively shallower depth due to the fluid flow paths created by the initial stimulation of the un-isolated open-hole interval 106. Therefore, open-hole intervals 108, 110 at relatively greater subterranean depths must be isolated prior to stimulation.

The extreme temperatures encountered in the EGS well 102 preclude the use of oilfield mechanical packers for isolation of open-hole intervals 106, 108, 110. Seal failure or sticking of these mechanical devices can effectively destroy operability of the entire EGS well 102. Also, the short length of typical packers can make them ineffective in sealing fractures that intersect the wellbore over a long length of the wellbore. The extreme EGS well temperatures also preclude the use of common oilfield diversion agents designed to plug unwanted fluid injection into portions of the EGS formation 104. Most organic polymers cannot withstand the EGS temperatures and the kinetics involved in removing inorganic materials are extremely difficult to control at EGS temperatures.

The temporary fracture sealing compositions 114 herein disclosed can be used during hydraulic stimulation operations to maximize energy recovery from the subterranean formation 104. The temporary fracture sealing composition 114 can be injected before, during or after stimulation of open-hole intervals 106, 108, 110. The temporary fracture sealing composition 114 can be also injected with stimulation fluid during stimulation operations to pressurize an un-isolated open-hole interval 106 and stimulate factures 112 therein. The sized solid particulate within the temporary fracture sealing composition 114 bridges off the face of the fracture, plugs or at least partially seals the fracture 112, thereby redirecting the flow of stimulation fluid into the subterranean well 102 or wellbore.

After sealing stimulated fractures 112 in a relatively shallower open-hole interval 106, additional stimulation fluid can be injected into the EGS well 102 to pressurize one or more isolated open-hole intervals 108, 110 containing unstimulated fractures 112 at relatively greater subterranean depths. Pressure created by the injected stimulation fluid opens or stimulates unstimulated fractures 112 having higher fracture initiation pressures within one or more isolated open-hole intervals 108, 110 without propagation of stimulated fractures 112 that are sealed with the temporary fracture sealing composition 114. In this way, fractures having the lowest initiation pressure are stimulated first and subsequently sealed with the temporary fracture sealing composition 114. Stimulated fractures in selected open-hole intervals can be sealed with the temporary fracture sealing composition 114 and unstimulated fractures in isolated open-hole intervals can be stimulated in order of increasing subterranean depth or in order of decreasing subterranean depth.

In subterranean wells such as geothermal wells, the well can be temporary cooled by the stimulation fluid during hydraulic stimulation operations. After stimulation operations, the EGS well 102 can be permitted to increase in temperature towards the geostatic temperature of the well 102. The increase in temperature causes degradation of the temporary fracture sealing composition 114. In this way, the temporary fracture sealing composition 114 can be removed from the face of fractures or from within fracture networks 112. After removal or degradation of the temporary fracture sealing composition 114, the fractures 112 revert to an unblocked state without damage to the fracture to allow recovery of heat from the subterranean formation 104. Heated water can be optionally injected into the subterranean well 102 to aid in the degradation and dissolution of the temporary fracture sealing composition 114. Increasing the number of stimulated fracture 112 intersecting the well 102 in the EGS formation 104 increases the subterranean heat exchange area available to generate heat. Increased heat exchange area will result in increased heat extraction and increased power production in surface electric power generation systems utilizing the heat.

Figure 2:
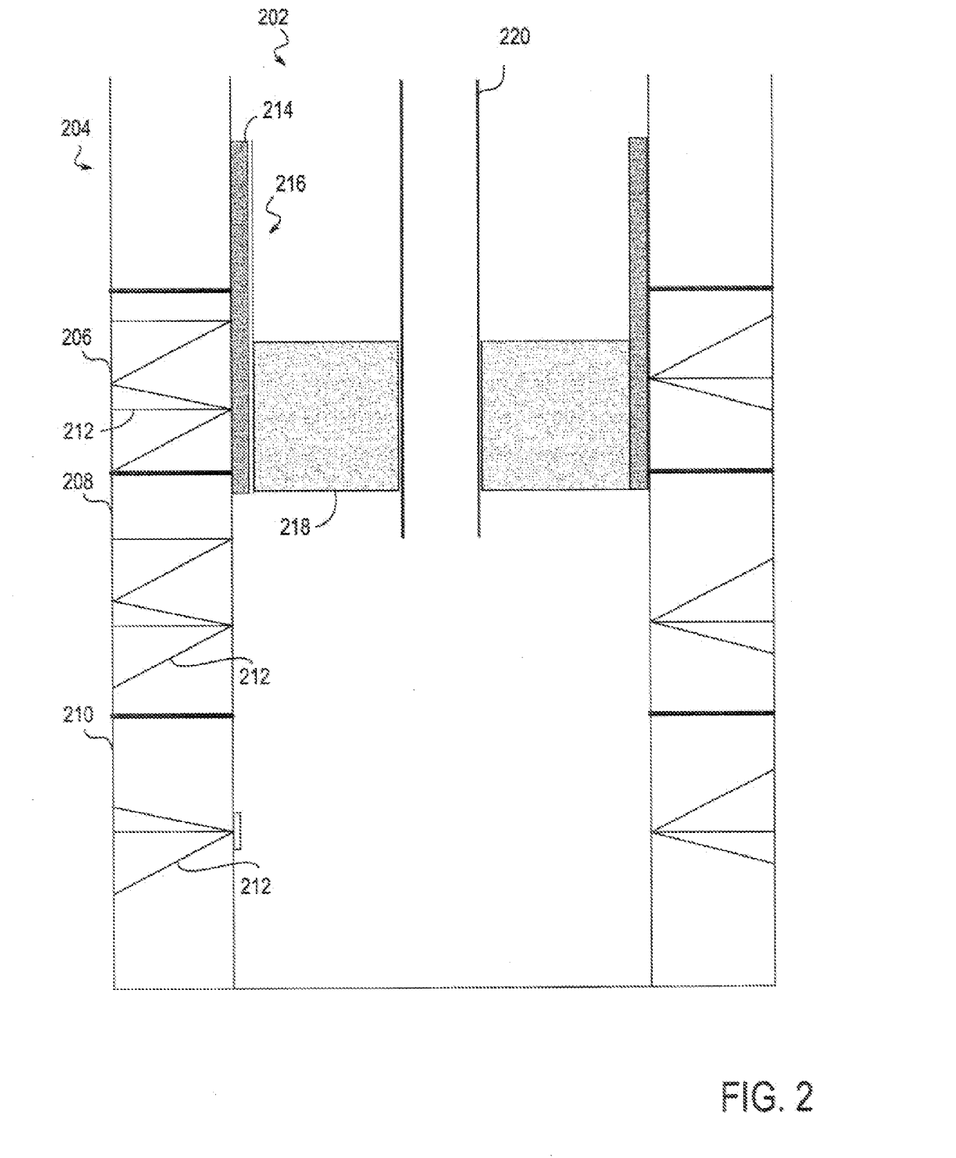
FIG. 2 illustrates an exemplary system for temporarily sealing fractures within a subterranean formation according to another embodiment.

FIG. 2 illustrates an exemplary system for temporarily sealing fractures within a subterranean formation 204 according to another embodiment. A subterranean well 202 can be drilled in a subterranean formation 204. The subterranean well 202 and subterranean formation 204 can include a series of open-hole intervals 206, 208, 210 located at varying subterranean depths. The subterranean formation 204 can also contain one or more fracture networks or fractures 212 within one or more of the open-hole intervals 206, 208, 210. The subterranean formation can be a geothermal formation 204 and the subterranean well can be a geothermal well 202. Fractures or fracture networks 212 intersecting the geothermal well 202 or wellbore create flow paths for operational fluids used during well drilling, well completion, production and fluid injection operations causing lost circulation of one or more operational fluids within the fractures 212.

An open-hole scab liner 216 can be deployed in the geothermal well 202 and the temporary fracture sealing compositions 214 herein disclosed can be used to cement the open-hole scab liner 216 to the wall of the well 202 or wellbore. The open-hole scab liner 216 can be used in this way to block a large open-hole interval 206 containing fractures 212 and to isolate one or more open-hole intervals 208, 210. One or more well packers 218 can also be deployed into the geothermal well 202 between, for instance an operational fluid conduit 220 and the scab liner 216. The operational fluid conduit 220 can be drill pipe, a drill string with a distal drill bit connected thereto or other conduit extending down below the well packer 218.

Operational fluids are blocked from entering fractures 212 within the blocked open-hole interval 206. Operational fluids such as drilling fluid or stimulation fluid can be pumped or injected through the operational fluid conduit 220 down below the blocked open-hole interval 206 into one or more isolated open-hole intervals 208, 210 in order to conduct one or more well operations. After the desired well operation, such as drilling or hydraulic stimulation is complete, the scab liner 216 and one or more well packers 218 can be removed from the geothermal well by allowing the temporary fracture sealing composition 214 to degrade. The temporary fracture sealing composition 214 can degrade under heat due to the increase in temperature of the geothermal well 202. The temperature of the geothermal well 202 can be permitted to increase naturally towards the geostatic temperature or other heated fluid or heating means can be used to increase the temperature of the well and degrade the temporary fracture sealing composition 214. In this way, a scab liner and/or a well packer can be temporarily secured in a high temperature environment to isolate open-hole intervals and to conduct well operations.

Figure 3:
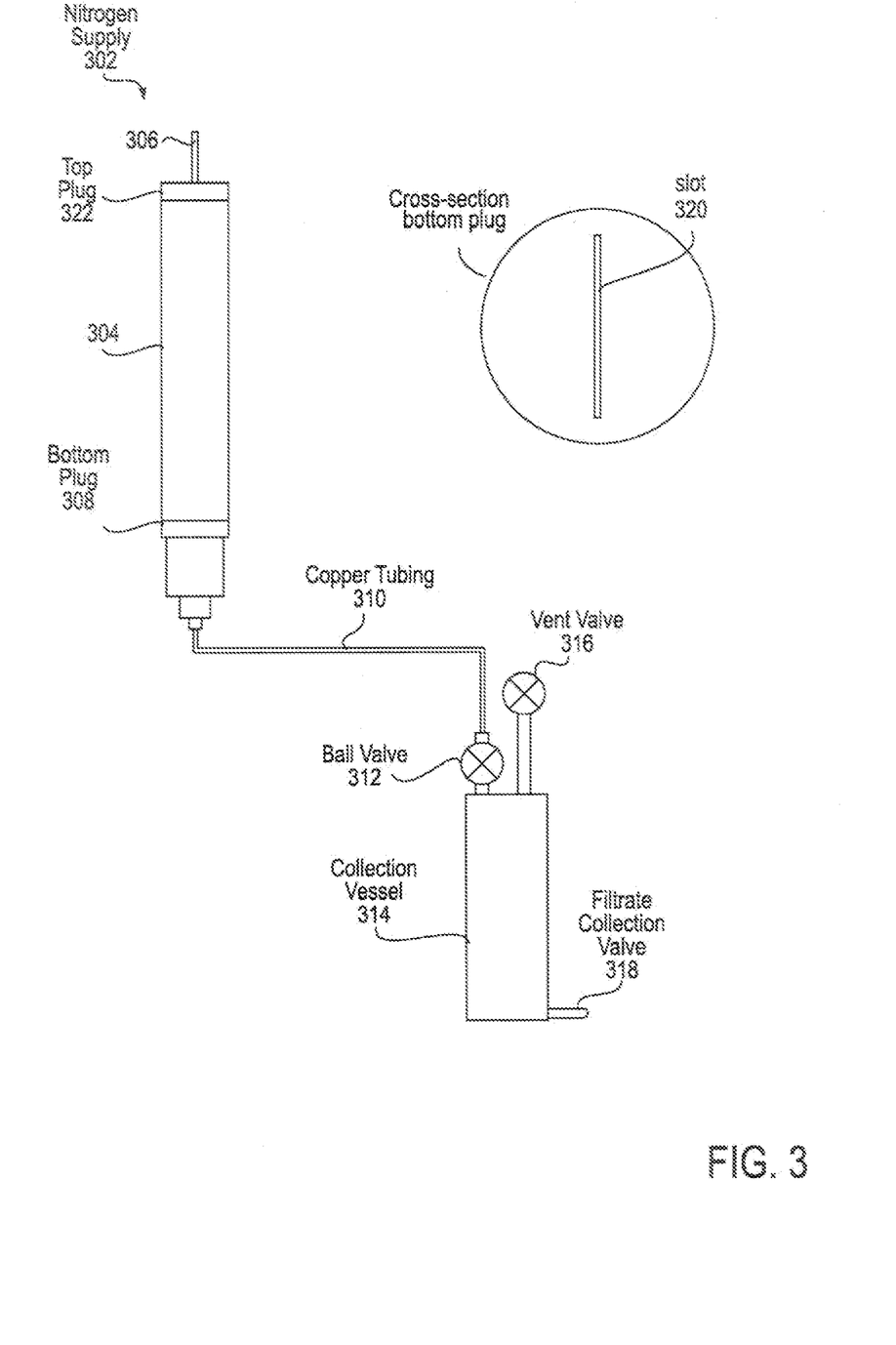
FIG. 3 illustrates a slow-flow test system used to determine the degree of sealing exhibited by exemplary temporary fracture sealing compositions.

FIG. 3 illustrates a slow-flow test system 302 used to determine the degree of sealing or diversion exhibited by exemplary temporary fracture sealing compositions. Table 2 lists exemplary temporary fracture sealing compositions that were evaluated. The slow-flow test system 302 includes a test cell 304 rated for 1000 psi and equipped with a heating jacket (not shown) capable of maintaining test temperature of up to 400° F. The slow-flow test system 302 also can include a nitrogen supply 306 for driving or pressurizing the temporary fracture sealing compositions through a slot 320 (1 mm×1.5 in) in a bottom plug 308. A top plug 322 maintains an upper pressure seal within the test cell 304. Copper tubing 310 can be provided to fluidly connect the test cell 304 to a ball valve 312 in a filtrate collection vessel 314. A vent valve 316 can release any excess nitrogen or other gas collected in the filtrate collection vessel 314 during testing. A filtrate collection valve 318 provides a fluid exit for filtrate in the filtrate collection vessel 314.

Even though the fluid injected in a well operation, such as an EGS well completion operation will typically be fresh water, an aqueous linear gel is utilized in this lab testing to suspend the temporary fracture sealing compositions while it is heated and loaded into the test cell 304. The viscosity produced by the gel at test temperature is minimal and has negligible effect on diversion or sealing results of the tested temporary fracture scaling compositions. Testing of the bridging and diverting capability of temporary fracture sealing compositions was performed according to the following procedure:

1. Mix 30 lb/1000 gal xanthan gel in water;
2. Add required amount of temporary fracture sealing composition with hand stirring;
3. Heat to test temperature of 160° F. in a roller oven;
4. Transfer temporary fracture sealing composition to preheated test cell;
5. Seal top of cell and place in heating jacket preheated to test temperature;
6. Apply 50 psi nitrogen pressure to top of slot cell and open bottom cell valve;
7. Record collector pressure vs. time. Stop test when collector vessel pressure equalizes to 50 psi; and 8. If collector vessel pressure remains below 50 psi for 5 minutes, increase pressure to 100 psi and continue monitoring. Repeat procedure until a test pressure of 200 psi is reached.

Quantifying Effectiveness Of Exemplary Temporary Fracture Sealing Compositions

The goal of this analysis is to develop a quantitative scaling technique between laboratory slot sealing tests with exemplary temporary fracture sealing compositions and potential field effectiveness. An analytical method based on the relationship of flow rate and pressure drop is proposed to relate the lab-produced slot sealing tests to operations, according to one embodiment. This method follows the production engineering principle of Productivity Index defined by the following equation:

$J = Q/\text{delta } p$; wherein $J$=productivity index, $Q$=flow rate, and $p$=pressure.

The leak-off index (L) of an exemplary temporary fracture sealing compositions can be quantified through the following equation:

$L = Q/\text{delta } p$; wherein $L$=leak-off index, $Q$=flow rate, and $p$=pressure The diverson effectiveness of an exemplary temporary fracture sealing composition can be defined with the following equation: $D_E = L_0/L_D = Q_0 \times \text{delta } p_D/Q_D \times \text{delta } p_0$; wherein $L_0$ is the initial leakoff index before diversion while $L_D$ is leakoff index after diversion. A ratio of $L_0$ to $L_D$ is defined as diversion effectiveness, $D_E$, represents effectiveness in terms of pressure and flow through an open fracture before and after application of an exemplary temporary fracture sealing composition. $D_E$ can be calculated from the slot data presented in the accompanying chart of slot flow data illustrated in FIG. 4 wherein the vertical axis represent the pressure (psi) at which an exemplary fracture scaling composition is forced through a slot and the horizontal axis represents time (seconds). Table 1 outlines the particle size distribution for each blend that was tested.

TABLE 1

PARTICLE SIZE DISTRIBUTION

Figure 4:
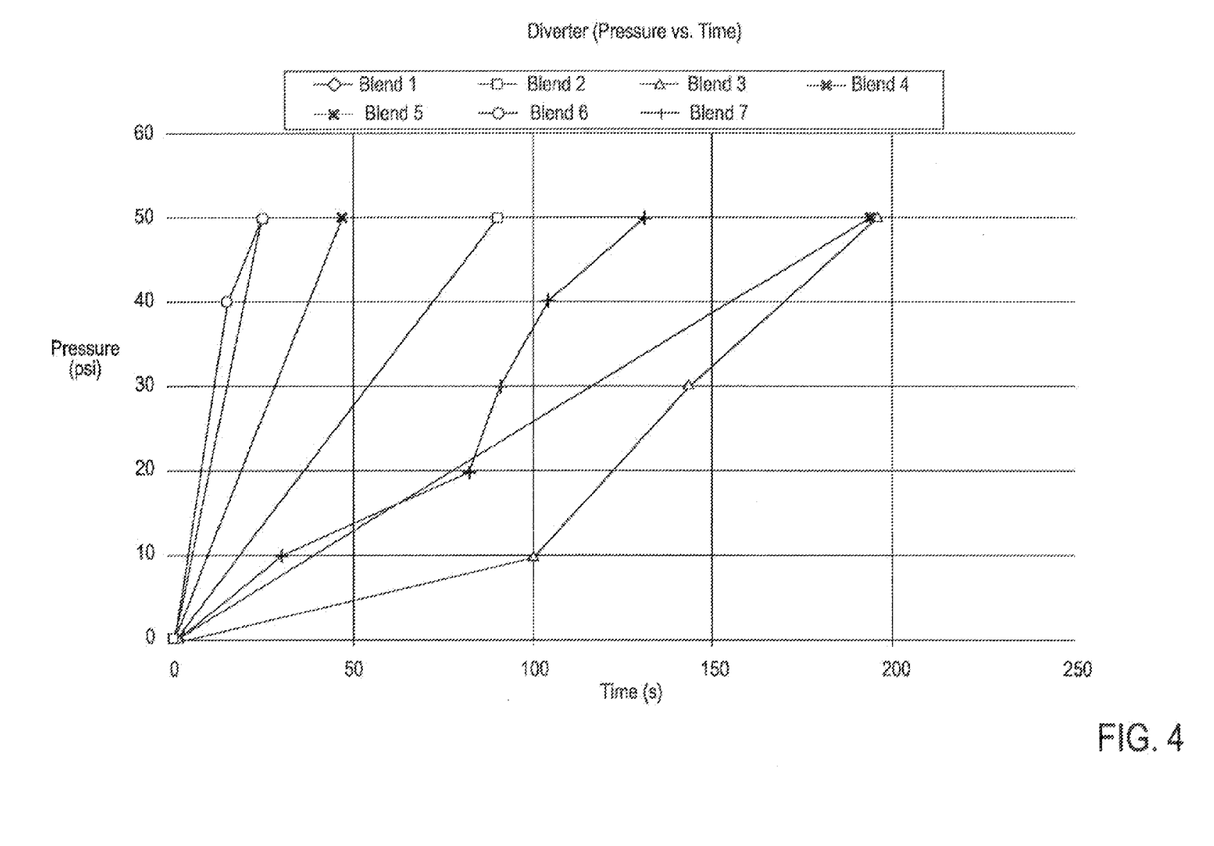
FIG. 4 illustrates the diversion effectiveness of exemplary temporary fracture sealing compositions with the vertical axis representing pressure in pounds per square inch and the horizontal axis representing time in seconds.

Blend 1 - 20mesh(8%) + 50mesh (40%) + 170mesh (50%) + 170' mesh (2%)
Blend 2 - 20mesh(8%) + 50mesh (40%) + 170mesh (50%) + 170' mesh (2%) + 3 lb/bbl LCM Material
Blend 3 - 20mesh(8%) + 50mesh (40%) + 170mesh (50%) + 170' mesh (2%) + 6 lb/bbl LCM Material
Blend 4 - 20mesh(8%) + 50mesh (12%) + 170mesh (80%)
Blend 5 - 20mesh(8%) + 50mesh (12%) + 170mesh (80%) + 6 lb/bbl LCM Material
Blend 6 - 170mesh (100%)
Blend 7 - 170mesh (100%) + 6 lb/bbl LCM Material For the laboratory evaluation data presented above and in FIG. 4, time for pressure to equalize in the filtrate collection vessel 314 corresponds to the flow rate of fluid through the slot 320. Flow rate in this case is for gelled carrier fluid flow through the bridged fracture followed by nitrogen volume sufficient to equalize pressure. This approximation of flow rate is applicable since it is reproducible and carrier fluid volume and collector vessel volume are always the same. Time plotted is for a standard flow volume so flow rate is inversely proportional to flow interval.

Therefore, the equation above reduces to the following equation: $DE = t_D/t_0$, wherein $t_0$=time for flow without diverter and $t_D$=time with exemplary fracture sealing composition added. The value for $t_0$ is 10 seconds. The unit of measurement for $t_D$ is seconds. The diversion treatment used on a 1 mm fracture reduces flow at the same pressure drop. Increasing pressure in the wellbore to open another fracture would marginally increase flow into the plugged fracture. This can also be estimated from the diversion effectiveness relationship. This relationship is then scalable to field operations. This test procedure can be used to predict pressure or flow rate increases in a wellbore after applying or introducing the exemplary fracture sealing compositions to an open fracture thereby allowing prediction of pressure or flow available to open a second fracture.

Degradation Testing

This degradation test procedure is designed to quantify degradation rates of exemplary temporary fracture sealing compositions used in EGS operations. The exemplary temporary fracture sealing compositions were mixed with fresh water at two specified operation temperatures (300° F. and 500° F.). The 300° F. temperature is estimated to be the maximum well temperature during injection mode to open fractures. The 500° F. temperature is the estimated static temperature of the EGS formation. A successful temporary fracture sealing composition will preferably survive curing of 14-days at 300° F. and loose less than 25% of original sample mass to degradation while undergoing 100% degradation during 28-days of 500° F. curing.

This screening procedure involves curing samples of each temporary fracture sealing composition in water-filled autoclaves heated to each test temperature. Chambers are cooled to room temperature after one week curing at test temperature. Specimens are removed from the curing chamber, washed, and weighed to determine degradation rates at each temperature. Samples are then returned to the curing chambers for an additional week of curing. The specimens are then re-washed and re-weighed to determine final degradation rates. The step-by-step procedure is following:

1. Weigh out approximately 2 gm specimens of each candidate material;
2. Place each material in a Buchner funnel and wash with water;
3. Weigh washed specimen without further drying to obtain a gross sample weight;
4. Place each specimen in a short threaded length of ¾ inch pipe capped on one end, fill with tap water and cap the other end;
5. Place multiple specimens into autoclaves. A specimen of each material is prepared for each autoclave;
6. Heat autoclaves to test temperatures and hold for one week;
7. Cool autoclaves;
8. Remove specimens, wash, weigh, and photograph;
9. Return any specimens not degraded beyond limits to the autoclaves for the second week of curing;
10. Cool autoclaves after the second week of curing;
11. Remove specimens, wash, weigh and photograph noting any development of sludge or other material that has changed appearance and may become permanently damaging to fracture flow; and
12. Continue testing at 500° F. until degradation stops or is complete.

Table 2 illustrates the results of the degradation of exemplary temporary fracture sealing compositions at 300° F. and 500° F. and percent degradation within 7, 14, 21 and 26 days.

TABLE 2

Exemplary Degradation Results

| Material | Temperature | Deg 7 days | Deg 14 days | Deg 21 days | Deg 26 days |
|---|---|---|---|---|---|
| MgOCl cement | 300 | 18.2% | 20.6% | curing | NA |
| MgOCl cement | 500 | 20.1% | 20.8% | curing | NA |
| MgOCl cement + 10% Gypsum | 300 | 6.0% | 16.3% | NA | NA |
| MgOCl cement + 10% Gypsum | 500 | 22.4% | 20.2% | 21.1% | 23.9% |
| MgOCl cement + 20% Gypsum | 300 | 0.0% | NA | NA | NA |
| MgOCl cement + 20% Gypsum | 500 | 10.9% | 14.1% | 19.2% | 24.0% |
| MgOCl cement + 10% gypsum + 10% Epsom Salt | 300 | 9.0% | NA | NA | NA |
| MgOCl cement + 10% gypsum + 10% Epsom Salt | 500 | 19.2% | 18.0% | 37.1% | 47.6% |
| MgOCl cement + 10% Calcium Silicate | 300 | 10.0% | 14.7% | NA | NA |
| MgOCl cement + 10% Calcium Silicate | 500 | 24.2% | 30.9% | 41.7% | 38.5% |
| MgOCl cement + 10% Calcium Carbonate | 300 | 6.7% | 10.7% | NA | NA |
| MgOCl cement + 10% Calcium Carbonate | 500 | 17.4% | 19.4% | 33.8% | 38.5% |
| Magnesium Oxysulfate Cement (12.5:1) | 300 | 7.2% | 15.1% | 16.1% | NA |
| Magnesium Oxysulfate Cement (12.5:1) | 500 | 2.9% | curing | NA | NA |
| Magnesium Oxysulfate Cement (5:1) | 300 | 9.2% | 13.7% | curing | NA |
| Magnesium Oxysulfate Cement (5:1) | 500 | 15.4% | 23.9% | curing | NA |
| 10% PLA in MgOCl cement | 300 | 28.1% | 23.1% | curing | NA |
| 10% PLA in MgOCl cement | 500 | 24.8% | 44.1% | curing | NA |
| 20% PLA in MgOCl cement | 300 | 38.6% | 37.3% | curing | NA |
| 20% PLA in MgOCl cement | 500 | 49.0% | 63.1% | curing | NA |

Figure 5:
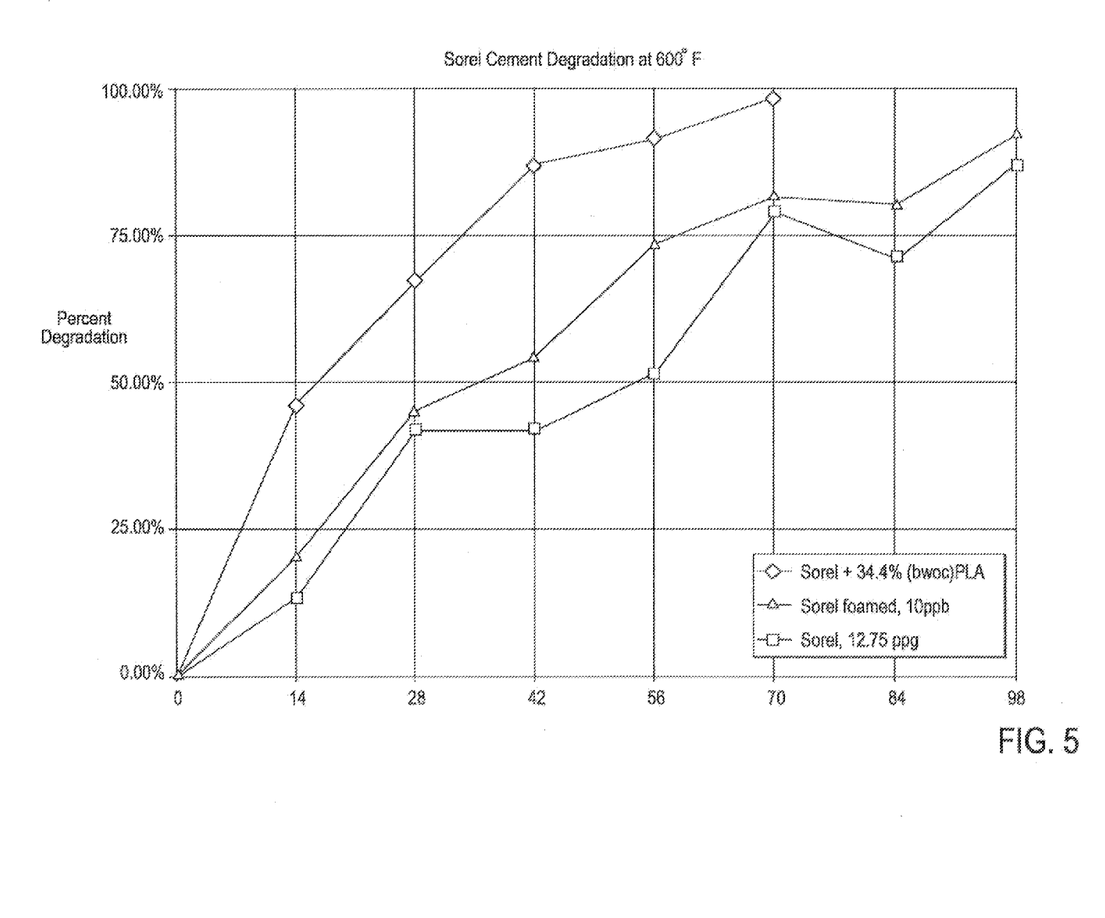
FIG. 5 illustrates 600° F. MgOCl degradation test results with the vertical axis representing percent degradation and the horizontal axis representing time in days.

FIG. 5 illustrates 600° F. MgOCl (Sorel Cement) degradation test results with the vertical axis representing percent degradation and the horizontal axis representing time in days. The top line represents the degradation of Sorel Cement plus 34.4% by weight of polylactic acid. The middle line represents the degradation of foamed Sorel Cement at density of 10 lbs/gallon. The bottom line represents the degradation of Sorel Cement at density of 12.75 lbs/gallon. The addition of polylactic acid increased the rate of degradation of Sorel Cement. Foaming the Sorel Cement also increased the degradation rate. The Sorel Cement plus 34.4% by weight of polylactic acid degraded fully in 70 days. Whereas the other two specimens did not degrade fully after 96 days.

Figure 6:
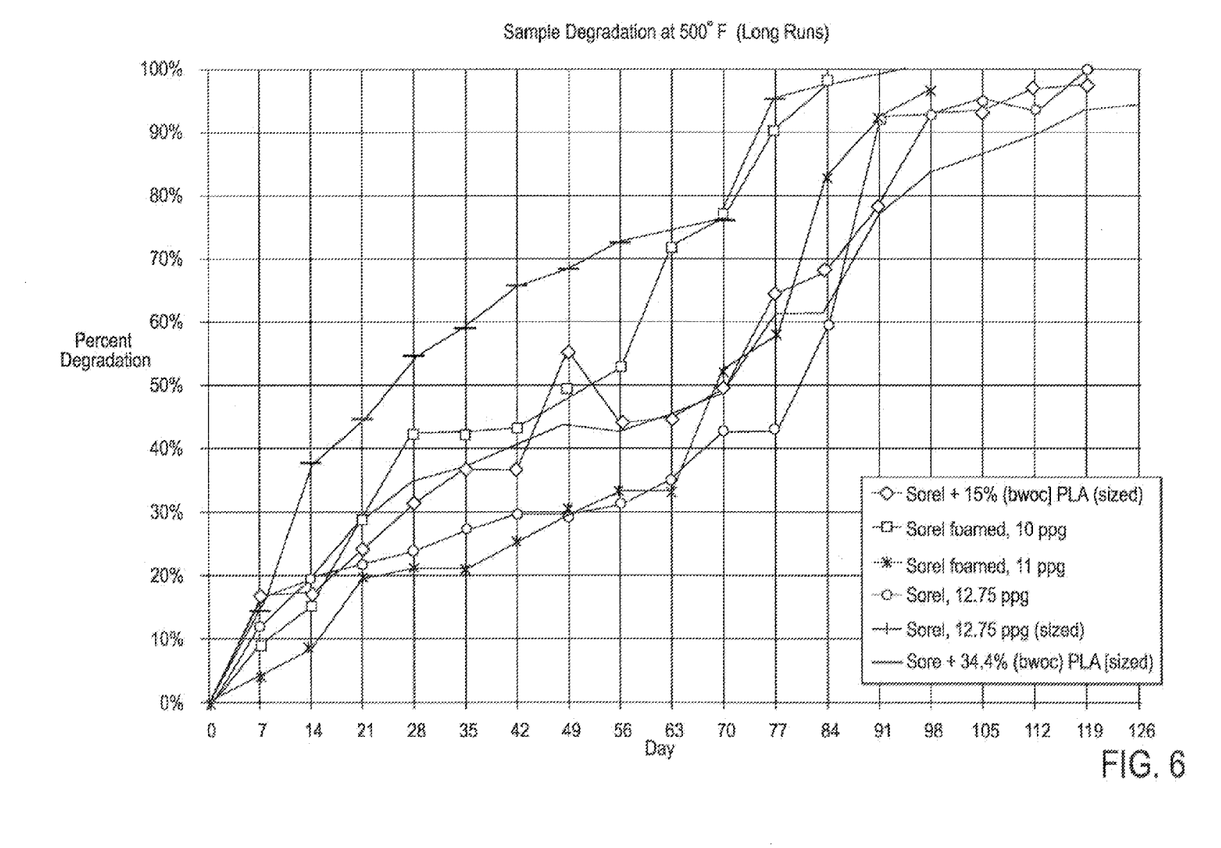
FIG. 6 illustrates 500° F. MgOCl degradation test results with the vertical axis representing percent degradation and the horizontal axis representing time in days.

FIG. 6 illustrates 500° F. MgOCl (Sorel Cement) degradation test results with the vertical axis representing percent degradation and the horizontal axis representing time in days. Adding polylatic acid or foaming the Sorel Cement increased the degradation rate.

Example embodiments have been described hereinabove regarding improved systems and methods for temporarily sealing fractures in subterranean formations. Various modifications to and departures from the disclosed example embodiments will occur to those having ordinary skill in the art. The subject matter that is intended to be within the spirit of this disclosure is set forth in the following claims.

What is claimed is:

1. A method comprising:
   introducing a temporary fracture sealing composition proximate a fracture within a wall of a subterranean well;
   cementing a liner to the wall of the subterranean well with only the temporary sealing composition, wherein the liner blocks a face of the fracture;
   permitting the temporary fracture sealing composition to substantially degrade; and
   removing the liner to unblock the fracture and allow recovery of heat from the subterranean well by production of geothermal fluid.

2. The method as recited in claim 1, wherein the temporary fracture sealing composition comprises magnesium oxychloride.

3. The method as recited in claim 2, wherein the magnesium oxychloride is a solid comprising particles.

4. The method as recited in claim 2, wherein the magnesium oxychloride is a liquid.

5. The method as recited in claim 1, wherein the temporary fracture sealing composition comprises magnesium oxysulfate.

6. The method as recited in claim 1, wherein permitting the temporary fracture sealing composition to substantially degrade comprises permitting the temporary fracture sealing composition to substantially degrade under heat in the subterranean well.

7. The method as recited in claim 1, wherein introducing the temporary fracture sealing composition proximate the fracture within the wall of the subterranean well comprises injecting the temporary fracture sealing composition into the subterranean well with an operational fluid.

8. The method as recited in claim 7, wherein the operational fluid is drilling fluid.

9. The method as recited in claim 7, wherein the operational fluid is stimulation fluid.

* * * * *